United States Patent [19]

Schell

[11] 4,173,426
[45] Nov. 6, 1979

[54] APPARATUS FOR THE AUTOMATIC LOADING OF A CONTINUOUSLY WORKING MACHINE

[76] Inventor: Friedrich Schell, Metterstr. 23, 714 Ludwigsburg-Pflugfelden, Fed. Rep. of Germany

[21] Appl. No.: 831,414

[22] Filed: Sep. 8, 1977

[51] Int. Cl.² ............................................. B65G 25/12
[52] U.S. Cl. .................................. 414/737; 198/482; 198/488; 198/690; 198/796
[58] Field of Search .............. 214/1 BD, 1 BV, 1 BH, 214/1 BC, 147 T; 198/482, 489, 490, 480, 488, 690, 796

[56] References Cited

U.S. PATENT DOCUMENTS

| 3,057,452 | 10/1962 | Cubbidge et al. | 198/482 |
| 3,406,837 | 10/1968 | Kirsch et al. | 214/1 BH |
| 3,884,344 | 5/1975 | Hurst | 198/690 |
| 4,052,780 | 10/1977 | Daniels | 214/1 BC |

Primary Examiner—Trygve M. Blix
Assistant Examiner—Ross Weaver
Attorney, Agent, or Firm—Craig and Antonelli

[57] ABSTRACT

An apparatus for automatically loading a continuously operating machine with workpieces, the apparatus including a loading arm which is adapted to receive workpieces and a gripper which is adapted to transfer workpieces from the loading arm to a further receiving device provided on a conveyor adapted to transport the workpieces past the continuously operating machine.

21 Claims, 3 Drawing Figures

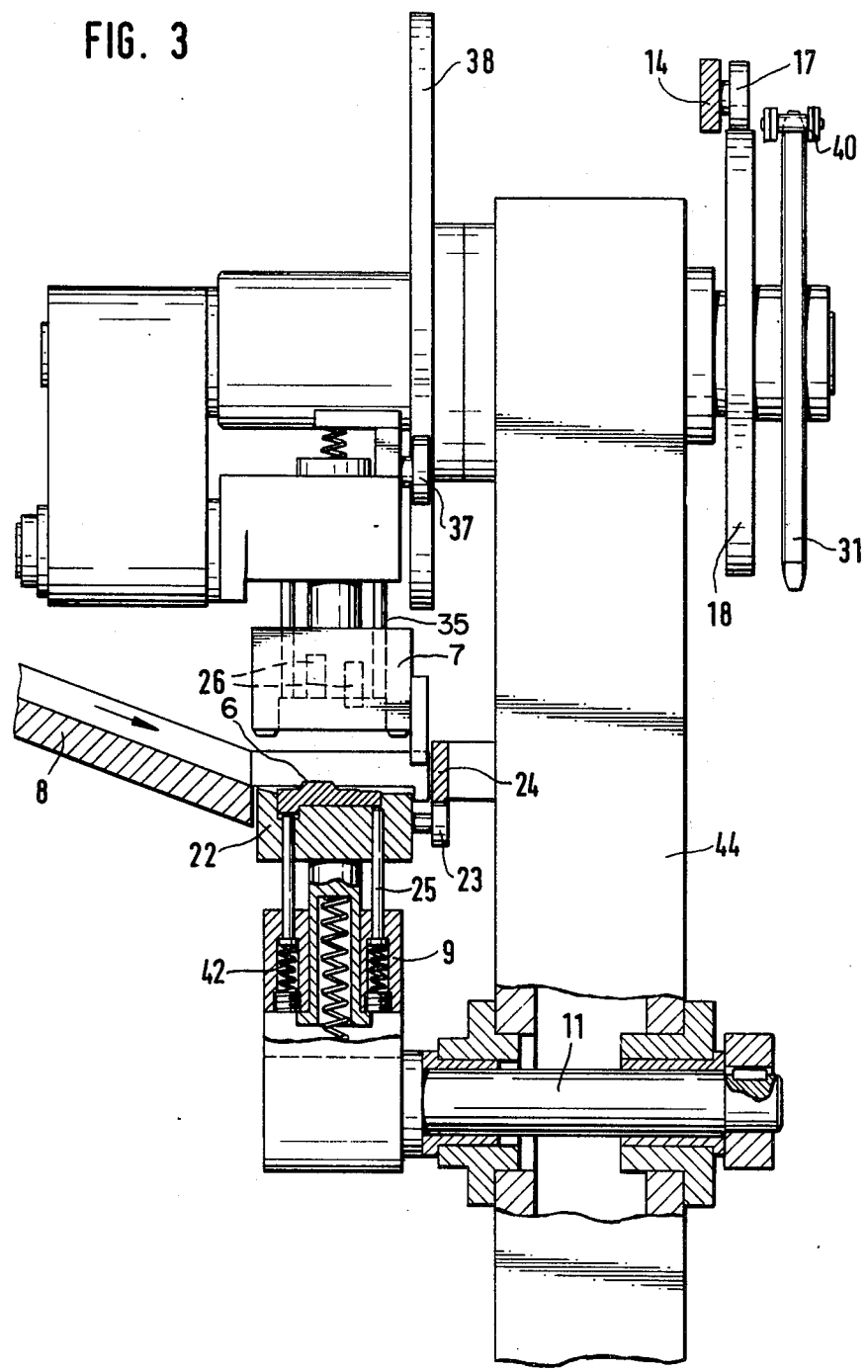

APPARATUS FOR THE AUTOMATIC LOADING OF A CONTINUOUSLY WORKING MACHINE

The present invention relates to an apparatus for the automatic charging of a continuously operating machine, especially a chain die-slotting machine having a conveyor device with a pivotal loading arm and rotating grippers which insert workpieces in a predetermined position into receiving and clamping devices, which accurately positioned, carry the workpieces past the die-slotting machine by means of an endless conveyor chain.

Apparatus of this kind are already in existence which are controlled pneumatically as well as electronically; however, they are very prone to breakdowns, since a large number of movements have to be controlled, and with the frequency of switching operations, control and transmitting components wear rapidly.

It is an object of the present invention to at least minimize the aforesaid disadvantages and to develop a loading or charging device which is adjusted in synchronism with the processing machine and which is capable of receiving the workpieces utilizing purely mechanical devices and to transfer them to the processing machine without interference in a time of from 2 to 4 seconds.

According to the present invention there is provided an apparatus for automatically loading a continuously operating machine with workpieces, more especially a chain die-slotting machine, with the loading apparatus having a pivotal loading arm and rotating grippers, wherein the workpieces are inserted in a predetermined position in receiving and clamping devices, which carry the workpieces past the slotter by means of an accurately positioned chain conveyor belt in which the respective workpieces, supplied by an inclined chute, are received by a workpiece receiving member of the loading arm in a terminal receiving position and, in a delivery end position of the loading arm, is transferred to the gripper. The gripper executes a rotary displacement around the center of a main shaft for transferring the workpiece from the loading arm to a further workpiece receiving member arranged on the chain conveyor belt. In a transfer region of the workpiece from the gripper to the further workpiece receiving member, a line extending through a periphery of a bottom end of the gripper and a line extending through an upper surface of the further receiving member are brought into a parallel relationship. In the transfer region the gripper executes a relative movement in a direction of a line connecting the centers of the main shaft and a supporting shaft of the conveyor belt whereby a ram of the gripper radially inserts the workpiece into the further receiving member. The workpiece may have previously been retained in the gripper by a permanent magnet.

The pivotal movements of the loading arm about the loading arm shaft are produced in a preferred embodiment of the invention, by a cam member rotating with the main shaft on which cam a roller is in rolling engagement, and which transmits the control movements, via a lever linkage, to the loading arm.

The loading arm is specifically designed to transfer the workpiece from the loading arm to the gripper. The workpiece receiving member of the loading arm preferably has a roller which is in rolling engagement on a cam member, whereby the workpiece receiving member is forced back against the pressure of a spring in the direction towards the loading arm shaft, and thereby the workpiece transferred to be received by the gripper, at the moment of transfer, is aligned in the direction of the connecting line of the center of the main shaft to the center of the loading arm shaft.

This rotating gripper now progressively conveys the workpiece. For this purpose, the gripper rotating with a supporting arm about the main shaft is desirably mounted so as to be rotatable and radially displaceable in a gripper guide and the pivotal movement of the gripper is caused by a roller which is in rolling engagement on a fixed cam disc. This cam disc causes the gripper, on its way from taking over the workpiece from the pivotal arm until the transfer to the receiving device, to assume the necessary position. If the longitudinal center axis of the gripper is located on the connecting line between the main shaft and the reversing shaft for the chain conveyor belt, then the gripper is forced back radially towards the supporting arm against the pressure of a spring, on the main shaft, when it settles on the receiving device, whereby the emerging rams lift the workpiece off the magnet in the gripper and insert it in the receiving device. During transfer, a projection located on the gripper abuts in the transfer region, against an associated stop on the receiving device thereby ensuring the correct position of the gripper, during transfer.

The receiving device then progressively conveys the workpiece by means of the chain conveyor belt. A stop then causes the workpiece to be clamped securely by a tension device and the workpiece is then carried past the die-slotter which is held in the slotter region by a support against which the chain conveyor belt and the receiving device is supported, so that the workpiece during the slotting is unable to yield to the slotter. The machined workpiece is again transferred at the other reversing roller of the chain conveyor belt.

After transfer of the workpiece by the gripper, the latter forcibly lifts off the receiving device again in that it continues its rotary movement about the main shaft. The driving shaft adjacent to the receiving region of the workpiece for the chain conveyor belt also drives the main shaft, which ensures the rotary movement of the gripper. Together with this main shaft, a cam disc is simultaneously moved which rolls off a roller, which roller transmits the control movements to the loading arm via the lever linkage. A chain is used for the transmission of the rotary movement by the driving shaft of the chain conveyor belt to the main shaft of the apparatus. Since the rotary movement of the chain conveyor belt and the gripper at the point of transfer, however, have to be synchronised, it is necessary for the driving shaft and the main shaft to execute rotary movement in the opposite direction. The driving chain which extends from the driving shaft to the main shaft is therefore not simply able to be looped in the usual manner around the driving shaft and main shaft, but after being looped around the driving shaft has to be passed, with the rear surface of a chain section, around the sprocket associated with the main shaft. The chain drive may, of course, be replaced by a gearwheel drive or any other optional driving device. In a gearwheel drive, a spurwheel mounted on the driving shaft and on the main shaft may simply mesh together.

As described above, the gripper retains the workpiece with a permanent magnet; however, alternatively, resilient levers or other suitable means may also be used.

The invention will be further illustrated, by way of example, with reference to the accompanying drawings, in which:

FIG. 3 is a section taken on the line III—III through parts of the apparatus of FIG. 1 in accordance with the invention, other parts being shown in elevation.

Figure 1:
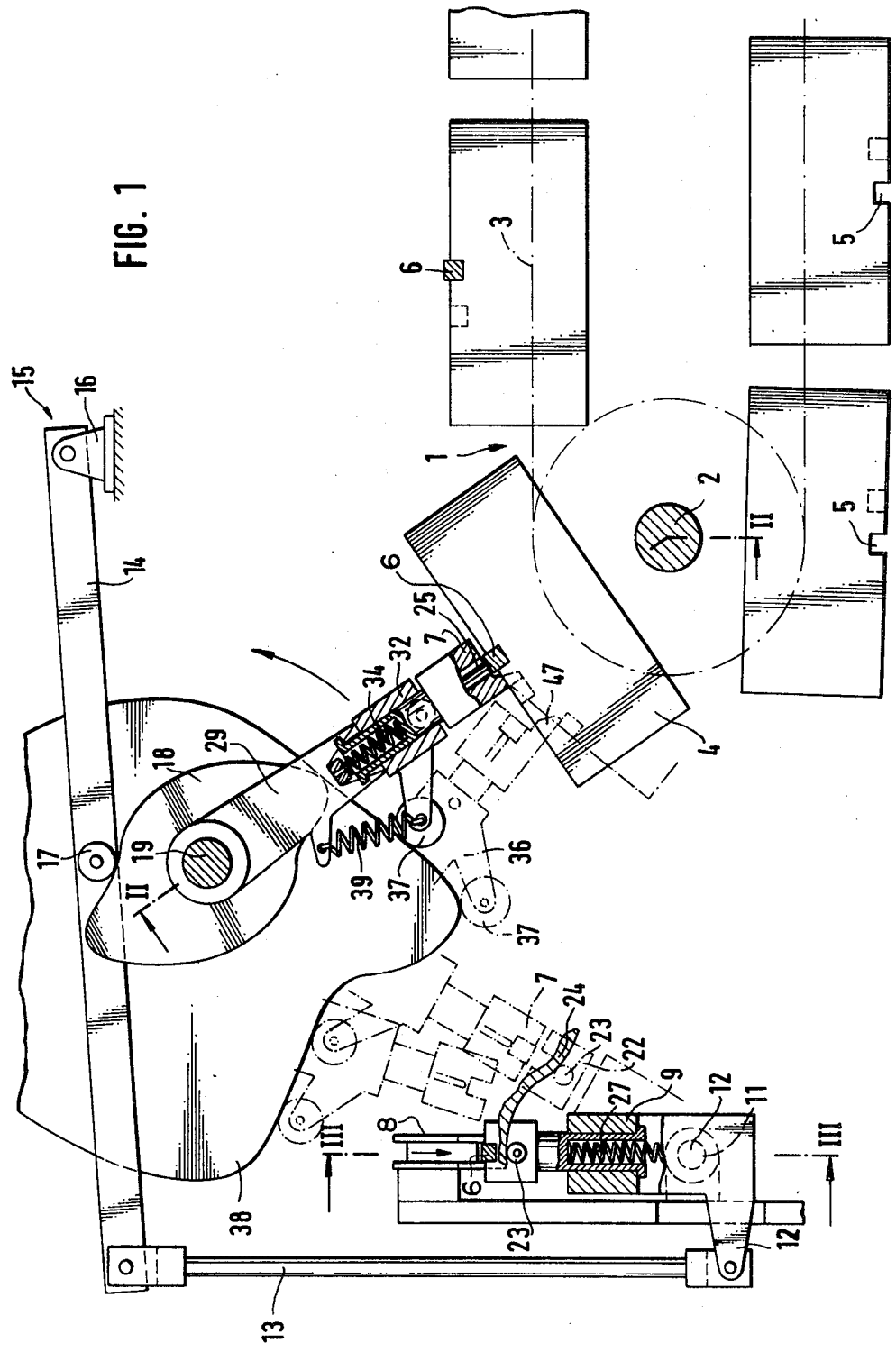
FIG. 1 shows a partial section in side elevation of an apparatus in accordance with the invention.

FIG. 1 shows schematically the conveying device 1 of a chain die-slotting machine. This view thus shows the driving shaft 2 for the chain conveyor belt 3 in section. The receiving device 4 is supported and progressively conveyed by the chain conveyor belt 3. Recesses 5 are formed in the receiving device 4 which recesses 5 are adapted to the dimensions of the workpiece 6. FIG. 1 shows that already two workpieces 6 are inserted in the receiving device, namely one workpiece 6 is in the process of being transferred from a gripper 7 to the receiving device 4 and a further workpiece 6 which has already been inserted in the preceding stroke.

As shown in FIG. 3, the workpieces of the apparatus in accordance with the invention are supplied by a sloping or inclined chute 8 and separated by a loading arm 9, located in connection with the inclined chute 8. The loading arm 9 is pivotally mounted on the loading arm shaft 11. For transmitting the pivotal movement, as shown most clearly in FIG. 1, the loading arm 9 supports a lever 12 and which has secured thereto a vertical lever 13, in turn a horizontal lever 14 is provided on vertical lever 13, which in combination form the lever linkage. The horizontal lever 14 is adapted as a one-armed lever and with one of its ends 15 being pivotally retained in a fixed bearing 16. A roller 17 is rotatably mounted in the central region of the horizontal lever 14 being in rolling engagement along a cam disc 18 which rotates with a main shaft 19 of the rotary gripper 7. The main shaft 19 is driven by the driving shaft of a chain drive, (not shown). The chain drive envelopes a corresponding sprocket of the driving shaft 2 and abuts with the outer surface of a section against a chain wheel of the main shaft 19, so that the driving shaft 2 and the main shaft receive different directions of rotation, i.e. the driving shaft 2 rotates clockwise, while the main shaft 19 rotates counterclockwise.

Since during the rotary movement of the main shaft, the cam disc 18 is also rotated therewith, the roller 17 rolls thereon and pivotally moves the horizontal lever 14 about its fixed bearing 16 so that, due to this movement, which is transmitted by the vertical lever 13 to the loading arm 9, the loading arm 9 is reciprocated.

A workpiece 6 supplied through the inclined chute 8 is picked up by a workpiece receiving member 22, as shown in FIG. 3. A roller 23 is mounted at the side of the workpiece receiving member 22, which roller 23 rolls on a cam member 24. By swivelling or pivoting the loading arm 9 from the receiving position into the delivery position, the rolling engagement of the roller 23 along the cam member 24 forces the workpiece receiving member 22 back against the pressure of a spring 27 in the direction of the loading arm shaft 11. However, two rams 25 retain the workpiece 6 in its position, so that the gripper 7 arriving in the meantime, receives the workpiece 6 which is retained in the gripper 7 by two permanent magnets 26 located thereon.

Figure 2:
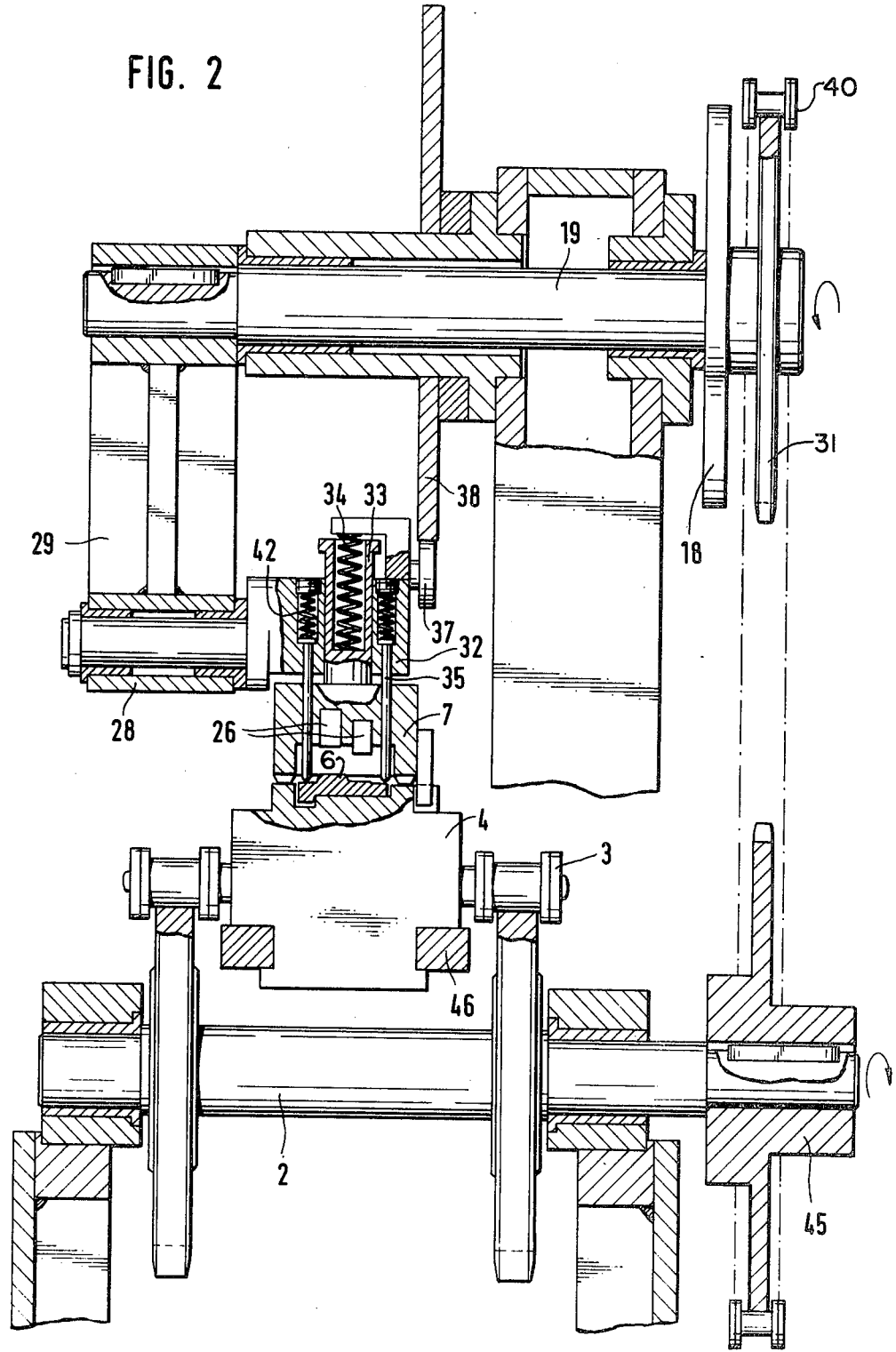
FIG. 2 is a section taken on the line II—II.

To ensure that the gripper 7 always assumes the correct and required position, as shown in FIG. 2, the rotary gripper 7 is pivotally mounted in a gripper guide 28 of a supporting arm 29. The supporting arm 29 is rotated by the movement of the main shaft 19 which is driven by a chainwheel 31. Moreover, the gripper 7 also has a gripper receiving member 32 with a bolt 33 mounting the gripper 7 in the gripper receiving member 32 so as to be displaceable radially to the gripper guide 28 against the pressure of a spring 34. Again, two rams 35 are provided which force the workpiece 6 out of the gripper 7 when the latter strikes against the receiving device 4 and is pressed back thereby.

FIG. 1 shows, in phantom line, the various positions of the gripper 7 during its rotary path around the centre of the main shaft 19. These positions are created in that a roller 37, supported by a cantilever 36 of the gripper 7 is in rolling engagement over a cam disc 38 which is fixed relative to the main shaft 19 and is urged against the roller 37 by a tension spring 39 which is suspended on the cantilever 36 and on the supporting arm 29.

For safety reasons, both the rams 25 in the pivotal loading arm 9 and the rams 35 are urged by springs 42 or 43 against their stops. These springs 42 or 43 are relatively strong, so that the rams 25 or 35 are pressed back only when a workpiece 6 has been wrongly inserted or has jammed or any other obstruction occurs.

A projection 47 (FIG. 1) is formed on the gripper 7 to ensure a correct insertion of the workpiece 6 into the receiving device 4, which projection 47 in the transfer region, abuts against an associated stop on the receiving device 4 and hence ensures the correct positioning of the gripper 7 during transfer of the workpiece 6 from the gripper 7 to the receiving device 4.

The driving shaft 2, the main shaft 19 and the loading arm shaft 11 are mounted in a component which hence provides the mounting for all three shafts.

The chainwheel 31 is driven via the chain 40 (FIGS. 2 and 3), the outer section of which is carried past the chainwheel 31, while the chain 40 on the other hand is looped around a corresponding chainwheel 45 (FIG. 2) on the driving shaft 2.

The receiving device 4 which is supported and progressively displaced by the chain conveyor belt 3 progressively conveys the inserted workpiece 6. The receiving device 4 has stop blocks 46 (FIG. 2) mounted thereon which, shortly after receiving the workpiece 6, are carried past a stop (not shown) whereby a tension device is activated which clamps the workpiece 6 securely in the receiving device. The workpiece 6 so securely clamped is carried past the die-slotting machine and then ejected at the other reversal of the chain conveyor belt 3.

What we claim is:

1. An apparatus for automatically loading a continuously operating machine with workpieces, the apparatus comprising:

a rotatably mounted main shaft, a loading arm means including a means for receiving the workpieces, a shaft means for pivotally mounting the loading arm means for movement between a workpiece receiving position and a workpiece delivery position, conveyor means for conveying the workpieces past the continuously operating machine including further means for receiving the workpieces, gripper means arranged between said loading arm means and said conveyor means for transferring workpieces from said loading arm means, when said loading arm means is in a delivery position, to said further workpiece receiving means on said conveyor means, said gripper means including means for retaining the workpieces therein during a transfer from the loading arm means to said further receiving means, and at least one ram means mounted in the gripper means for causing the workpiece in the gripper means to be inserted into the further workpiece receiving means during a transfer operation, means for mounting said gripper means at said main shaft so as to be rotatable therewith and also movable relative thereto in a direction of said at least one ram means, said gripper means and said conveyor means are arranged with respect to one another such that, in a transfer region of the workpiece from the gripper means to the further receiving means, a line extending through a bottom end surface of the gripper means and a line extending through an upper peripheral surface of the further receiving means are brought into a parallel relationship whereby the gripper means executes a relative movement in a direction of a line connecting centers of the main shaft and a supporting shaft of the conveyor means so that the workpiece in the gripper means is radially inserted into the further receiving means on the conveyor means.

2. An apparatus as claimed in claim 1, wherein a cam means is provided for defining a path of displacement of the loading arm means from the workpiece receiving position to the workpiece delivery position, said cam means being mounted on the main shaft for rotation therewith, and a linkage means interposed between the cam means and the loading arms means for transmitting control movements to the loading arm means, said linkage means including a cam follower means in engagement with said cam means.

3. An apparatus as claimed in claim 2, wherein means are provided for mounting said workpiece receiving means of the loading arm means so as to be radially displaceable relative to said shaft means pivotally mounting said loading arm means, said mounting means including a spring means for normally urging said workpiece receiving means of the loading arm means radially outwardly, a further cam means provided for controlling a radial positioning of said workpiece receiving means of said loading arm means, a cam follower means provided on said loading arm means for transmitting control movements from said further cam means to said workpiece receiving means of said loading arm means, said loading arm means and said gripper means are arranged with respect to one another such that, at the moment of transfer of the workpiece from the loading arm means to the gripper means, the gripper means and the loading arm means are aligned in a direction of a line connecting centers of the main shaft and the shaft means pivotally mounting the loading arm means.

4. An apparatus as claimed in claim 3, wherein said means for mounting said gripper means includes a supporting arm means, a guide means, and means for permitting a radial displacement of the gripper means, an additional cam means is provided for defining the positions of the gripper means relative to the loading arm means and the further workpiece receiving means during a rotation of the main shaft and cam follower means provided on said gripper means and engageable with said additional cam means for transmitting predetermined control movements to said gripper means.

5. An apparatus as claimed in claim 4, wherein a spring means is provided for normally urging the gripper means into a radially outward position with respect to the main shaft, and wherein the gripper means and the further receiving means are brought into engagement during a transfer operation so that the gripper means is displaced radially against the bias of said last-mentioned spring means so that said at least one ram means displaces the workpiece from the retaining means of the gripper means and inserts the workpiece into the further receiving means.

6. An apparatus as claimed in claim 5, wherein means are provided for insuring an alignment of the gripper means and further receiving means during a transfer operation including at least one projection provided on the gripper means, and an associated stop means provided on the further receiving means, said projection and stop means being brought into engagement during a transfer operation.

7. An apparatus according to claim 6, wherein means are provided for supplying workpieces to the loading arm means.

8. An apparatus according to claim 7, wherein said supplying means includes an inclined chute operatively associated with the workpiece receiving means of the loading arm means.

9. An apparatus according to claim 8, wherein the conveyor means includes an accurately disposed section at least in a transfer region of the workpiece from the gripper means to said further workpiece receiving means.

10. An apparatus according to claim 9, wherein said retaining means for retaining the workpieces in the gripper means includes magnetic means.

11. An apparatus according to claim 10, wherein said magnetic means is constructed as a permanent magnet.

12. An apparatus according to claim 10, wherein said conveyor means includes a chain conveyor belt.

13. An apparatus according to claim 12, wherein said continuously operating machine is a die-slotting machine.

14. An apparatus according to claim 1, wherein means are provided for mounting said workpiece receiving means of the loading arm means so as to be radially displaceable relative to said shaft means pivotally mounting said loading arm means, said mounting means including a spring means for normally urging said workpiece receiving means of the loading arm means radially outwardly, a cam means provided for controlling a radial positioning of said workpiece receiving means of said loading arm means, a roller means provided on said loading arm means for transmitting control movements from said further cam means to said workpiece receiving means, said loading arm means and said gripper means are arranged with respect to one another such that, at the moment of transfer of the workpiece from the loading arm means to the gripper means, the gripper means and the loading arm means are aligned in a direction of a line connecting centers of the main shaft and the shaft means pivotally mounting the loading arm means.

15. An apparatus according to claim 14, wherein said means for mounting said gripper means includes a supporting arm means, a guide means, and means for permitting a radial displacement of the gripper means, a further cam means is provided for defining positions of the gripper means relative to the loading arm means and the further workpiece receiving means during a rotation of the main shaft, and cam follower means are provided on said gripper means and are engageable with said further cam means for transmitting predetermined control movements to said gripper means.

16. An apparatus according to claim 15, wherein a spring means is provided for normally urging the gripper means into a radially outward position with respect to the main shaft, and wherein the gripper means and the further receiving means are brought into engagement during a transfer operation so that the gripper means is displaced radially against the bias of said last-mentioned spring means so that said at least one ram means displaces the workpiece from the retaining means of the gripper means and inserts the workpiece in the further receiving means.

17. An apparatus to claim 16, wherein means are provided for insuring an alignment of the gripper means during a transfer operation including at least one projection provided on the gripper means and an associated stop means provided on the further receiving means, said projection and stop means being brought into engagement during a transfer operation.

18. An apparatus according to claim 1, wherein means are provided for supplying workpieces to the loading arm means.

19. An apparatus according to claim 18, wherein said supplying means includes an inclined chute operatively associated with the workpiece receiving means of the loading arm means.

20. An apparatus according to claim 1, wherein means are provided on said gripper means and said further workpiece receiving means for insuring a correct positioning of the gripper means and the further workpiece receiving means during a transfer of the workpiece.

21. An apparatus according to claim 1, wherein said means for retaining the workpieces in the gripper means includes magnetic means.

* * * * *